Patented Apr. 29, 1930

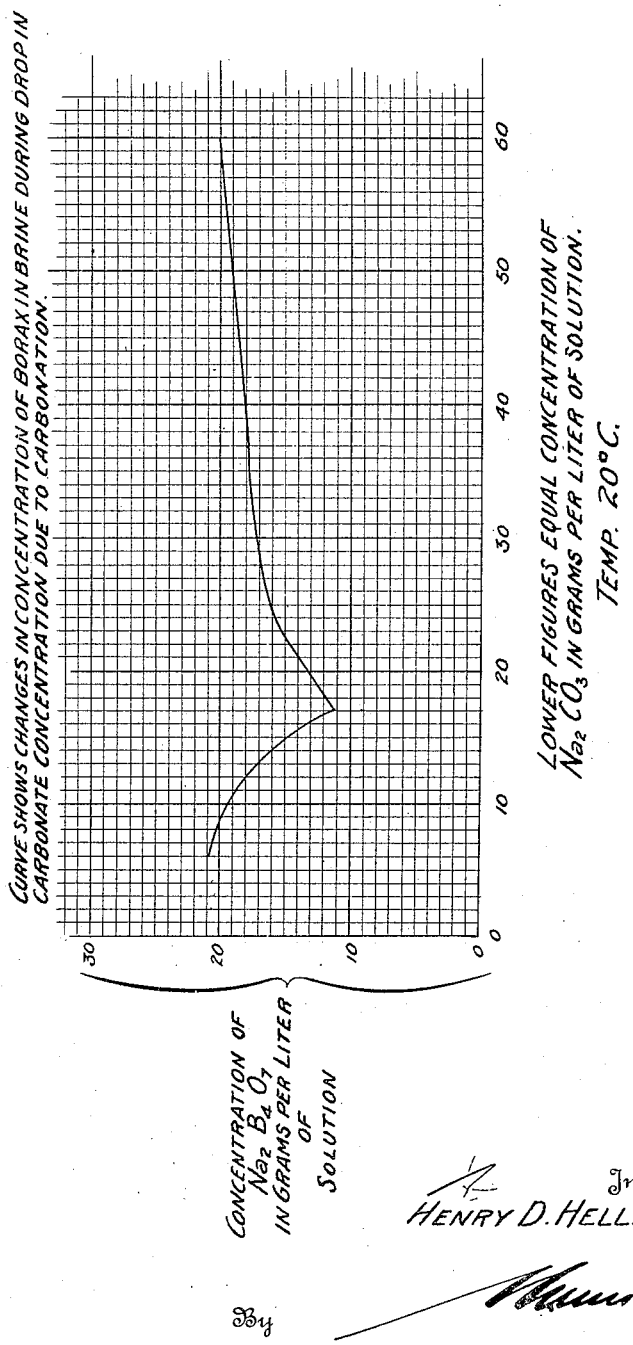

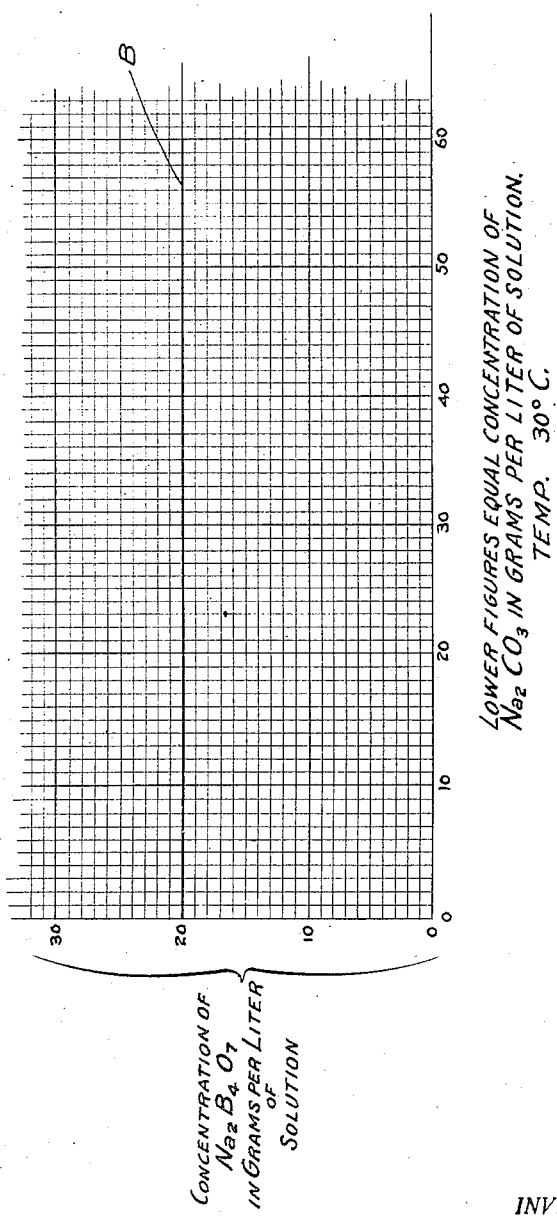

1,756,122

UNITED STATES PATENT OFFICE

HENRY D. HELLMERS, OF WESTEND, CALIFORNIA, ASSIGNOR TO WEST END CHEMICAL COMPANY, OF OAKLAND, CALIFORNIA, A CORPORATION OF CALIFORNIA

PROCESS FOR RECOVERING BORAX FROM BRINE

Application filed October 24, 1925. Serial No. 64,686.

This invention relates to methods of recovering or separating borax from natural brines containing borates of sodium together with other salts particularly carbonates of sodium in solution.

Among such brines may be mentioned the brine of Searles Lake, California. Following is a typical analysis of brine from this lake:

| | G. p. l. |
|---|---|
| NaCl | 210 |
| $Na_2SO_4$ | 89 |
| $Na_2CO_3$ | 62.1 |
| KCl | 66.7 |
| $B_2O_3$ as sodium borates | 14.5 |

This brine contains about three times as much carbonates of sodium as it does borates of sodium and the particular object of this invention is to effect through simple operations the recovery and separation from each other of a large part of the borax and soda content. In the treatment of such brine with carbonic acid gas for the precipitation of the carbonates largely as bicarbonates, I have discovered a change in the borax suspending properties of the liquid, that will permit the recovery and separation of a large part of the soda content and obtain a solution, from which the maximum amount of borax may be crystallized.

The chart #1 accompanying this application shows graphically the average concentration of borax and sodium carbonates in brine as it is pumped in its raw state from Searles Lake and the change in concentration of these substances during treatment with carbonic acid gas, carried out at temperatures below 25 degrees centigrade.

In the chart, the initial concentration in grams per liter of both salts is taken at the right hand end of the chart, the figures along the base line indicating the changing concentration of the sodium carbonates and the curve indicating the relative changing concentration of the borax as taken against the values of the vertical scale. When the brine is treated with carbonic acid gas by any suitable means, a precipitation of the carbonates of sodium, either as double salts or as bi-carbonate results, as well as a precipitation of some of the borax, probably in the form of tetraborate to be later redissolved as treatment progresses. Upon continuing the gas treatment, the carbonate concentration falls from the initial 60 or more grams per liter and if lowered to about ten g. p. l. or less, then the largest part of the borax that may have crystallized during the progress of the $CO_2$ treatment, will have gone back into solution, thus leaving but very little borax precipitated even if cooled or agitated.

I believe the following to be the explanation of the behavior of the borax and soda during carbonation as described above:

First the $CO_2$ gas reacts with sodium carbonate to form bicarbonate

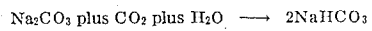
$Na_2CO_3$ plus $CO_2$ plus $H_2O \longrightarrow 2NaHCO_3$ and with the sodium metaborate present to form sodium tetraborate

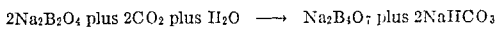
$2Na_2B_2O_4$ plus $2CO_2$ plus $H_2O \longrightarrow Na_2B_4O_7$ plus $2NaHCO_3$ After all of the carbonates have been converted to the bicarbonate and all of the borates converted to the tetraborate, then further $CO_2$ treatment will probably result in a system that has an excess of $CO_2$ in solution forming carbonic acid. The carbonic acid is a stronger acid than boric acid and, therefore, an equilibrium is probably established, where some of the boric acid in the tetraborate is replaced by carbonic acid, and some free boric acid results in solution.

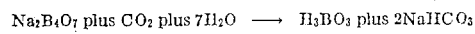
$Na_2B_4O_7$ plus $CO_2$ plus $7H_2O \longrightarrow H_3BO_3$ plus $2NaHCO_3$ This results in an increased solubility of total $B_2O_3$ and the borax that is precipitated during earlier stages of carbonation at lower temperatures goes back into solution, as soon as enough excess of $CO_2$ has been applied.

When the carbonation is carried out at temperatures above 25 degrees no borax will be crystallized at any stage of the carbonation due to the increased solubility of tetraborate at these higher temperatures. See chart #2.

Should this be the case, then at the end of the $CO_2$ treatment a liquor is obtained, that is essentially the same as if the temperature had been lower. In chart #2 the curve is essentially straight as shown by line B. If now the treated brine, after separating from the precipitated carbonates of sodium, be then mixed with a portion of untreated or partly treated brine or other soda or borax liquors that are not saturated with carbon dioxide gas, then the above described reaction is reversed and an equilibrium is established where all of the borax is converted to the tetraborate.

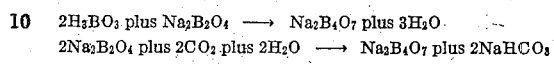

$2H_3BO_3$ plus $Na_2B_2O_4 \longrightarrow Na_2B_4O_7$ plus $3H_2O$ $2Na_2B_2O_4$ plus $2CO_2$ plus $2H_2O \longrightarrow Na_2B_4O_7$ plus $2NaHCO_3$ This results in a solution supersaturated with respect to tetraborate and this may be crystallized out by cooling to less than 25 degrees, if necessary, and preferably applying agitation also. The reduction of the carbonate concentration to about 7 to 8 g. p. l. or less is not necessarily the critical point, but is found to be a satisfactory concentration for carrying out the process described.

The process may be varied by carbonating the brine above 23 degrees centigrade until part of the carbonate content of the brine has been precipitated. It will be found that at temperatures above 23 degrees centrigrade practically no borax will crystallize during the carbonation. If the carbonation is then stopped, when the carbonate content is down to about 14 g. p. l. and the brine then cooled and preferably agitated, nearly pure borax will crystallize. I do not regard 14 g. p. l. as being the critical point, but prefer to stop carbonating about there. It is understood that during the gas treatment of the brine an excess of $CO_2$ gas may or may not be present.

In either case the precipitated or crystallized borax may be separated from the mother liquor by any suitable means and then further purified by washing or recrystallizing as desired.

In contemplating my invention as above set forth, it should be noted that it involves on commercial scale the precipitation of nearly pure borax from raw lake brine that has not undergone any preliminary concentrating treatment by evaporation as well as from brine that has undergone such treatment. It is the discovery of the changing of the solubility of borax in the brine during the different stages of treatment with $CO_2$ gas, as indicated by the chart, upon which my invention is based. It also involves the separation of borax from soda and recovery of both in commercial quantities from raw brine.

I claim:

1. The method of recovering borax from brine containing borate in solution together with sodium carbonate, which consists in treating the brine with carbonic acid gas to precipitate some of the carbonates, removing the precipitated carbonates from the solution, and crystallizing out the borax by cooling.

2. The process of treating brine containing carbonates of sodium and sodium borates, which consists in treating the brine with $CO_2$ until any borax that has been precipitated during the earlier stages of the carbonization has been largely redissolved, separating the precipitated salts of sodium from the solution and crystallizing out the borax.

HENRY D. HELLMERS.